C.H., L.J & W.S M<sup>c</sup> Cormick.
Mower.
N° 20212        Patented May. 11, 1858
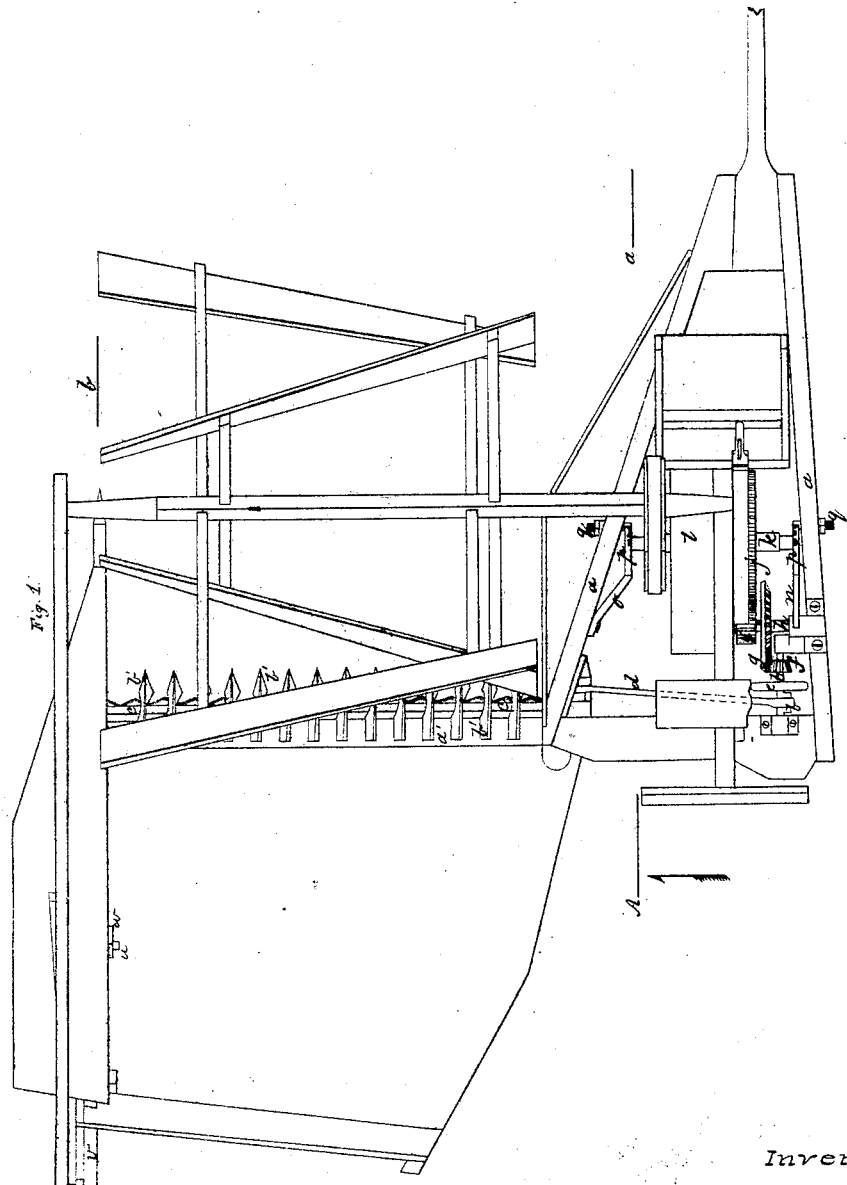
Witnesses
Inventors
L. J. M<sup>c</sup>Cormick
W<sup>m</sup> S. M<sup>c</sup>Cormick
C. H. M<sup>c</sup>Cormick

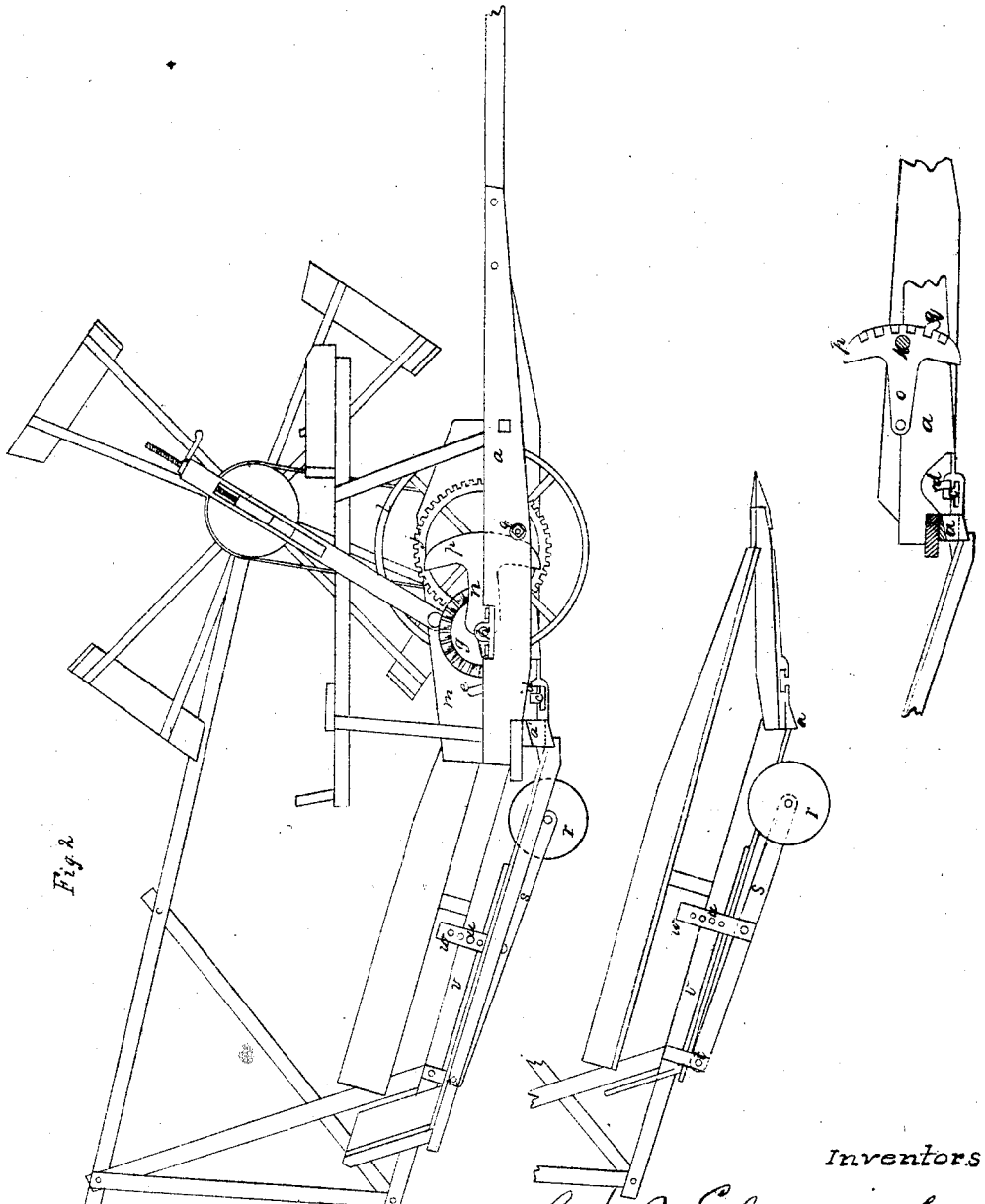

UNITED STATES PATENT OFFICE.

L. J. McCORMICK, WM. S. McCORMICK, AND C. H. McCORMICK, OF CHICAGO, ILLINOIS.

IMPROVEMENT IN REAPING AND MOWING MACHINES.

Specification forming part of Letters Patent No. 20,212, dated May 11, 1858.

*To all whom it may concern:*

Be it known we, L. J. McCORMICK, WM. J. McCORMICK, and CYRUS H. McCORMICK, all of Chicago, in the State of Illinois, have invented certain new and useful Improvements in Reaping and Mowing Machines, of which the following is a full, clear, and exact description, reference being had to the accompanying drawings, making part of this specification, in which—

Figure 1 is a plan of the machine; Fig. 2, a side elevation, and Figs. 3 and 4 vertical sections taken at the lines A *a* and B *b* of Fig. 1.

The same letters indicate like parts in all the figures.

It is important that reaping and mowing machines should be so constructed that the cutting part may be shifted and set at various heights from the surface of the ground, and that this may be readily done and still have the gearing to operate equally well at any part of the whole range of elevation at which the machine can be set; and it is also important in such machines that the bar from which the separating-fingers project, and in front of which the cutting instrument operates, should pass over the ground freely, and ride over any inequality presented by the surface of the ground, that the fingers and the cutting instrument may not strike against and be injured by such projections, while at the same time it will not prevent the cutting-edge from reaching and cutting leaning grass or grain.

Our present invention relates to improvements on the machine described in Letters Patent granted to the said C. H. McCormick on the 23d of October, 1847, and reissued on an amended specification on the 24th day of May, 1853; and it consists in making the bar which carries the separating-fingers and the vibrating sickle of a single bar of iron made thin at its forward end and gradually thicker toward the back, presenting in its cross-section a wedge form, with the sharp edge forward. Its upper surface should be horizontal, or nearly so, and its under surface inclined backward and downward, that it may act throughout its length and breadth in the manner of a runner to pass readily and safely over the inequalities of the surface of the ground. By this construction of the finger-bar the forward edge, which carries the fingers and cutter, is sufficiently elevated from the surface of the ground to prevent the sickle from cutting into and being injured by projections from the surface of the ground, the inclined under surface acting as a runner to pass and ride over inequalities of the surface without the liability to sink in soft or loose ground, as when narrow runners are employed, as heretofore known and practiced, and at the same time we obtain the required strength in the bar by the thickness of the back, notwithstanding the forward edge, which carries the fingers and cutters, is made very thin, so that leaning grass, &c., may be reached and cut before the thick part of the bar reaches it to beat it down in front of the cutter, as would be the case if the finger-bar was of equal thickness in its cross-section, or was provided with narrow wedge-formed bearers, which readily sink in the ground, and which frequently permit obstructions or slight elevations of the surface to pass between the fingers to the cutting-edge.

The accompanying drawings represent a machine such as will be found described in the Letters Patent before recited, with the present improvements added thereto. The gearing of the said machine is arranged between the two hounds *a a*, and consists of a crank-shaft, *b*, which communicates motion to the vibrating sickle *c* by a connecting-rod, *d*. This crank-shaft carries a fly-wheel, *e*, and a bevel-pinion, *f*, which receives motion from a bevel-wheel, *g*, on a shaft, *h*, which carries a pinion, *i*, receiving motion from the master-wheel *j* on the axle *k* of the driving and bearing wheel *l*. One journal of the shaft *h* runs in a box attached to the outside hound, and the other in a box attached to a board, *m*, which divides the gearing from the driving wheel, the better to protect the cog-gearing against the occasional dropping of dirt from the driving-wheel.

The axle *k* of the driving and master wheels is mounted in the forward end of two arms, *n o*. The arm *n* has its rear end fitted to turn on that box of the shaft *h* which is secured to the outside hound, and the other arm, *o*, is fitted to turn on a wrist-pin attached to the inside hound; and these two arms must be so mounted that they will turn or vibrate on the line of the axis of the shaft *h* that carries the pinion $i$, that engages with and receives motion from the master-wheel $j'$, so that this pinion and the master-wheel will continue in gear, notwithstanding the forward end of the arms may be elevated or depressed relatively to the frame.

The arms at their forward ends are formed in sectors $p\ p$, the inner faces of which, along the forward edge, are notched at given and equal distances apart to receive the heads of two screw-bolts, $q\ q$, (one for each sector,) that pass through holes in the hounds, and secured outside by screw-nuts. By this means it will be seen that by loosening the screw-bolts the sector-arms carrying the driving and master wheels can be depressed or elevated, and then secured and firmly held in place to depress or elevate that side of the machine and secure it at any desired elevation from the surface of the ground, the fitting of the heads of the screw-bolts in the notches of the sectors having the effect to hold the parts firmly in place during the working of the machine to insure the proper working of the gearing. The further advantage of this arrangement is that the crank-axle always bears the same relation to the vibrating sickle, no matter how much the frame may be elevated or depressed relatively to the bearing and driving wheel. The other end of the finger-bar and cutting apparatus can be elevated or depressed in a corresponding degree by having the guide-wheel $r$ mounted in the forward end of a frame, $s$, the rear end of which turns on a fulcrum-pin, $t$. This frame is secured in any position desired to suit the required elevation by a screw-bolt, $u$, which passes through a brace, $v$, of the frame, and a standard, $w$, attached to and extending upward from the frame $s$, the said standard having a series of holes at different elevations to admit of the required adjustment.

The finger-bar $a'$ is a bar of iron which, in its cross-section, is wedge-formed. Its upper surface, to which the fingers $b$ are secured, should be horizontal, or nearly so, and its under surface inclined backward and downward. The forward edge of this bar should be very thin and the back edge very thick from end to end. As the cutting-edge of this sickle is on a level, or nearly so, with the upper surface of this bar and in advance of its forward edge, and the under surface of the bar slopes downward, it will act in the manner of a runner along its entire length, and pass and ride over projections on or off the surface, and thus prevent the fingers and sickle from being injured, while at the same time the slope is such that in entering grain or grass which leans forward the under surface of the bar will not beat or force the grass down below the line of action of the sickle, but will permit it to be reached and cut by the sickle, which important result could not be accomplished if the bar was of equal thickness in front and rear, or provided with a series of wedge-formed bearers which permit obstructions to pass between them, and which sink into the surface of soft and yielding ground until the fingers and cutting-edge are brought in contact with obstructions.

What we claim as our invention, and desire to secure by Letters Patent, is—

Making the finger-bar of a mowing-machine of a bar of iron wedge-formed in its cross-section, with its forward edge, which carries the fingers, made thin that the sickle may act upon and cut leaning grass, and with its rear edge thick to obtain the required strength, and the under surface inclined that it may act like a runner to pass and ride over the surface of the ground to keep the cutting-edge of the sickle clear of obstructions while at the same time it can have access to leaning grass, all substantially as described.

L. J. McCORMICK.
WM. S. McCORMICK.

Witnesses:
  H. A. BLAKESLY,
  EDWARD J. SEYBURN.

C. H. McCORMICK.

Witnesses:
  MICHAEL LARNER,
  JOHN S. HOLLINGSHEAD.